March 2, 1965 P. P. PACUK 3,171,653
SWING
Filed Sept. 12, 1963 2 Sheets-Sheet 1
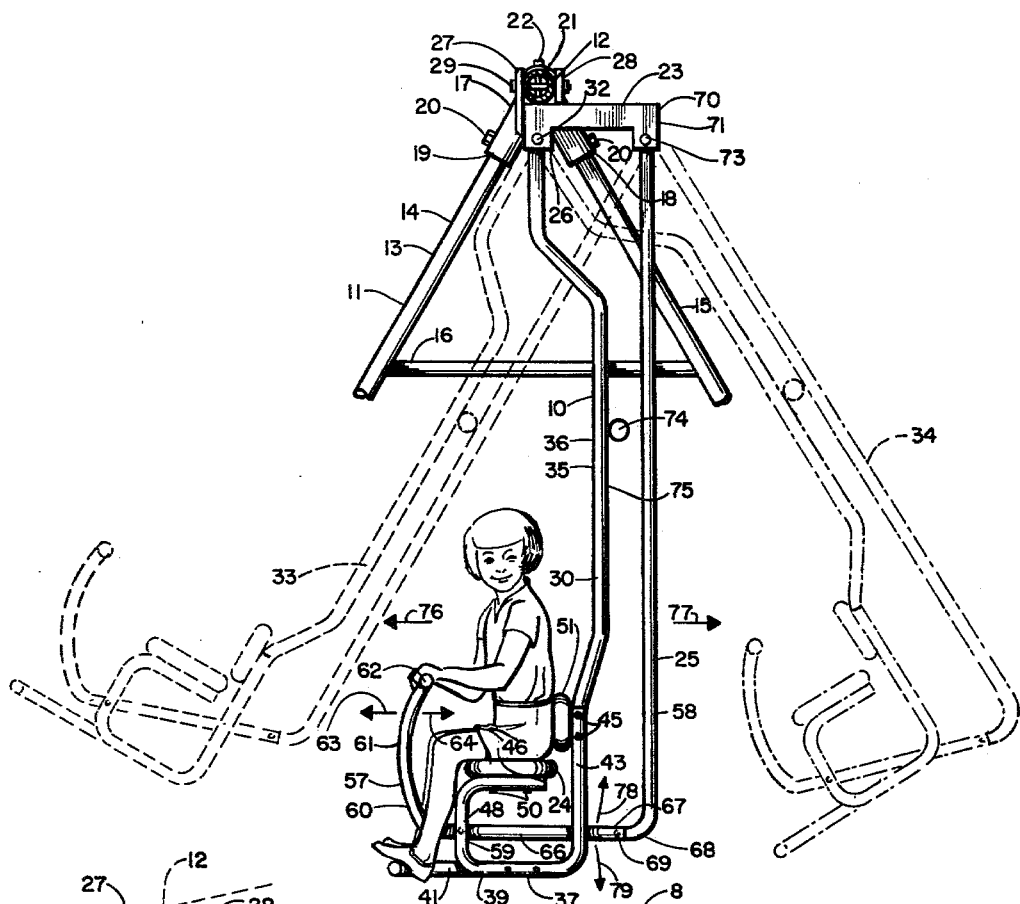
FIG. 1
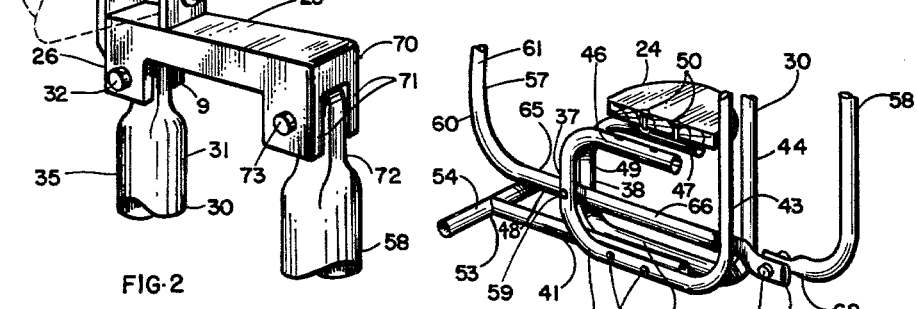
FIG. 2
FIG. 3
PETER P. PACUK, INVENTOR.
BY BALDWIN & MARTIN March 2, 1965 P. P. PACUK 3,171,653
SWING
Filed Sept. 12, 1963 2 Sheets-Sheet 2
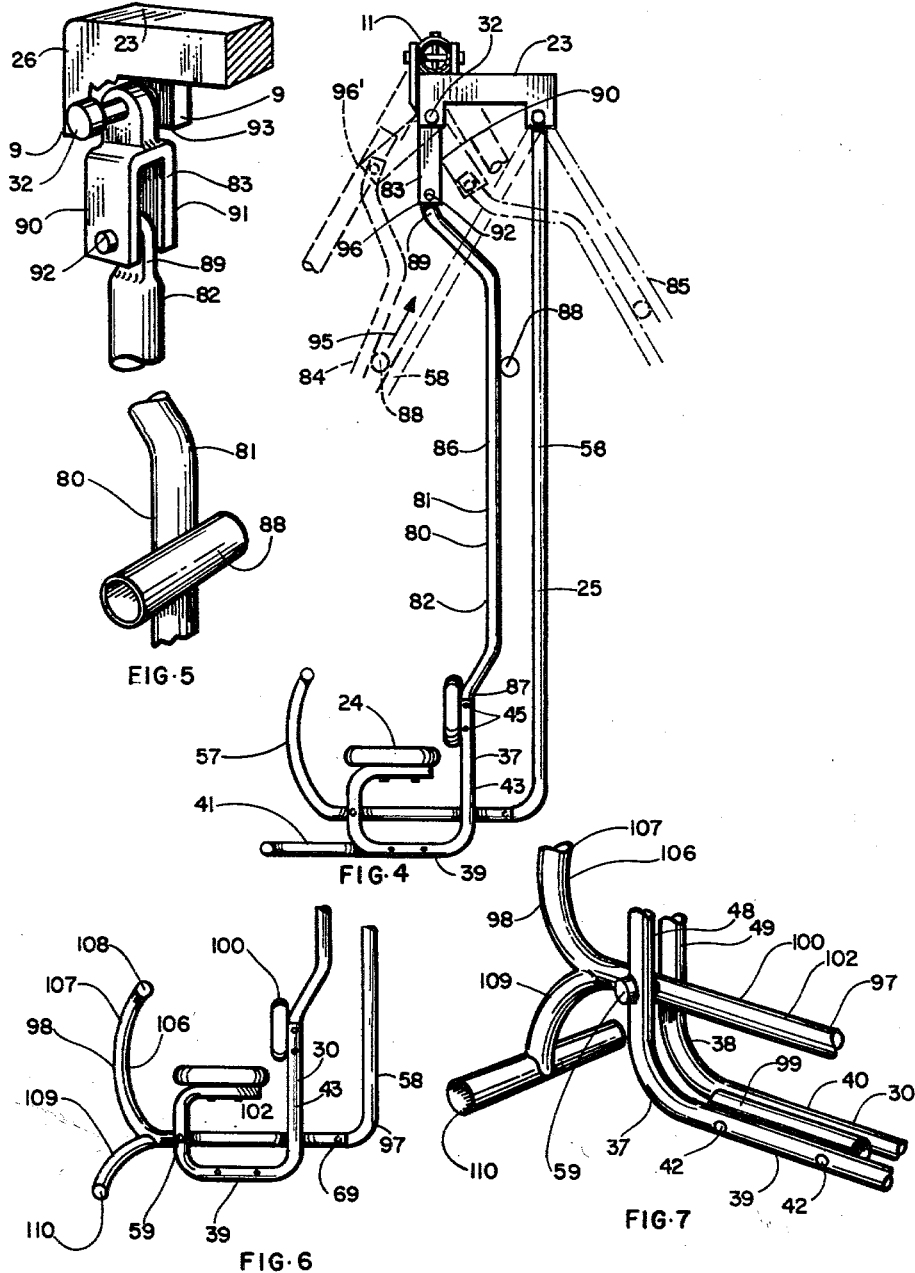
PETER P. PACUK INVENTOR.
BY BALDWIN & MARTIN United States Patent Office 3,171,653
Patented Mar. 2, 1965

3,171,653
SWING
Peter P. Pacuk, 2355 Cedar Shore Circle,
Jacksonville 10, Fla.
Filed Sept. 12, 1963, Ser. No. 308,399
5 Claims. (Cl. 272—87)

This invention relates to swings and more particularly to swings that are provided with means by which the swings' occupant can impart an oscillatory motion to the device.

A general object of the invention is to provide improved exercise devices of the swing type and which may be propelled by the user thereof.

Another object of the invention is to provide a swing having a mechanism by which the swing occupant can impart an oscillatory motion to the device, the moving components of the mechanism being so arranged in relation to the occupant of the swing seat as to provide a safe surrounding for the occupant and which as a consequence enables the swing to be safely used by small children and persons afflicted with ailments that affect their sense of balance and/or the control of their limbs.

Another object of the invention is to provide a swing which can be propelled in an oscillatory manner by the occupant of the swing and which is simple in construction, easy to manufacture from cheap materials and which is safe for the occupant to use.

Small children, epileptics, persons afflicted with cerebral palsy, as well as others whose nervous system is impaired, at least on occasions, lose control of their limbs and/or sense of balance. This is dangerous to the individual when the loss of control occurs at a time when the individual is adjacent to machinery or other devices that have parts which are in motion or capable of being moved. Not infrequently the individual will grab, or attempt to grab, the nearest means for support and if the means is a moving or moveable component the results are sometimes disastrous in that hands become injured, fingers smashed, and the like.

Exercise is of course important therapy for persons afflicted with nerve impairments but many devices that may be used by normal individuals for exercise purposes are unsafe for afflicted persons. For example, the moveable components of the usual swing devices used for the purposes of exercise, such as levers and other components that pivot or swing, frequently are so arranged relative to other components of the device as to provide areas that are potentially dangerous to the user. With small children and those afflicted with never damage that prevents voluntary control of their hands or other parts of the body, such limbs frequently become inadvertently or uncontrollably engaged in the moving or moveable components of ordinary self-propellable swings and injury thereto is the obvious result.

A special object of the invention is to provide a swing which can be oscillated by the swing occupant and in which the components of the oscillating device are so arranged relative to the occupant as to provide a practical maximum degree of safety for the occupant in the event of a fall or loss of control of the limbs.

Another object of the invention is to provide features in a swing provided with means operable by the occupant for oscillating the device, and which features serve to safely limit the swinging movement that can be imparted to the swing and/or to safely brake the oscillatory movements at predetermined forward and rearward positions of swing so as to prevent excessive shifts in the center of gravity during use of the device and which otherwise might upset the supporting framework for the swing.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a side elevational view of a device embodying certain features of the invention, forward and rearward positions that may be assumed by the swing in use being shown in broken lines.

FIG. 2 is an enlarged perspective view of a fragment of the device shown in FIG. 1 depicting principally the means employed for securing the swing to the suspension bar of a supporting framework therefor.

FIG. 3 is an enlarged perspective view of the lower components of the swing showing the general location of certain moveable components through which the oscillatory motion is imparted to the swing by the occupant.

FIG. 4 is a side elevational view of a device like that shown in FIG. 1 except for certain modifications which provide a braking action at the forward and rearward extremities of swing movement.

FIG. 5 is an enlarged perspective view of a linkage component and parts adjacent thereto which are used in the modified embodiment shown in FIG. 4, certain parts being broken away or removed to show the cooperation of the parts.

FIG. 6 is a side elevation of the lower part of a swing similar to that shown in FIGS. 1 through 3 with certain modifications designed to permit the oscillatory motion to be imparted to the swing by both the hands and the feet of the seat occupant.

FIG. 7 is an enlarged perspective view of a fragment of the embodiment shown in FIG. 6.

With reference to the drawings wherein like parts in the illustrated embodiments are designated with like numerals, a swing embodying certain concepts of the invention is shown in FIGS. 1–3, and designated with the numerals 10. It is shown as suspended from a framework commonly sold and employed for suspending swing type apparatus, and which is designated with the numeral 11. Framework 11 has a horizontally disposed tubular bar component 12 from which the swing 10 is suspended and which is supported horizontally above the ground 8 at its opposite ends by side frames, such as that shown at 13, in FIG. 1. Frame 13 has forwardly and rearwardly inclined legs 14, 15 which are interconnected and secured intermediate their opposite ends by a horizontal brace 16. The upper ends of legs 14 and 15 come together at an angle as seen in FIG. 1 and fit into oppositely inclined sleeve components 17, 18, respectively, of a bracket 19 whereat they are secured by a bolt element 20. Bracket 19 has another sleeve portion 21 which extends horizontally and fits over the end of the suspension bar 12 thereat and to which the bar is secured by bolt element 22.

Swing 10 is suspended from bar 12 between the side frames of framework 11 and has an elongated hanger bar 23 at its upper end from which the swing seat 24 is suspended and to which the oscillating mechanism 25 is connected. The forward end 26 of hanger 23 fits beneath bar 12 and is provided with a pair of transversely extending plates 27, 28 which lap the front and rear faces of the bar 12. Plate 27 is welded upright to the front end of the hanger 23 whereas plate 28 is offset rearwardly thereof and fixed upright to the top surface of the hanger 23. Plates 27 and 28, as seen in FIGS. 1 and 2, are so spaced at the front end of the hanger as to receive bar 12 therebetween, and the hanger 23 is releaseably secured to the bar 12 by bolt type fastener 29 that extends through the plates 27, 28 and through the intervening section of bar 12 therebetween.

The seat 24 of the swing 10 is secured to the lower portion of an elongated rigid seat supporting member 30 which in turn is pivotally connected at its upper end 31 to the hanger 23 by a pivot element 32. Element 32 establishes a horizontal axis that extends transversely in the framework 11 for swinging movement of member 30 between the position shown therefor at the forward position for the swing, depicted at 33, and the rearward position therefor, depicted at 34. Member 30 comprises an elongated bar element 35 which is bent between its opposite ends to provide a section 36 that is offset rearwardly of the horizontal pivot for the member 30 when the apparatus is viewed in the normal suspended position shown in solid lines in FIG. 1. The lower portion of member 30 is bifurcated and the legs of the bifurcated portion are formed by a pair of C-shaped bar elements 37, 38 that are laterally spaced and arranged in parallel in the seat supporting assembly. The lower sections 39, 40 of the elements 37, 38 are disposed horizontally and in parallel with the upper sections 46, 47 thereof, and are rigidly spaced apart by a tubular member 41. Member 41 is secured between sections 39 and 40 by fasteners 42. Sections 39, 40 are provided with vertical extensions 43, 44 at their rear ends and these upright extensions lap the adjacent sides of and at the lower end of bar 35. Hereat, the leg forming elements 37, 38 of the bifurcated lower end portion of member 30 are rigidly secured to the bar 35 by bolt type fasteners, designated at 45.

The upper sections 46, 47 of elements 37, 38 extend rearwardly and in parallel with each other from the upper ends of the vertically extending front sections 48, 49 of the elements, and the seat 24 is supported on and fixed to these upper sections 46, 47 by means of bolt type fasteners 50. Extensions 43, 44 are arranged in parallel with sections 48, 49 and project above and in back of seat 24. A back rest 51 for the occupant is secured at the upper ends of extensions 43, 44 by suitable fasteners.

In the embodiment shown in FIGS. 1–3, tubular member 41 extends forwardly of the upright sections 48, 49 and at its front end 53 is provided with a rigid transversely extending across member 54 which is affixed to the end and serves as a footrest for the seat occupant.

As seen in FIG. 2 the upper end 31 of bar element 35 is pinched and fits between a pair of transversely spaced depending ear components 9 of the hanger. Ears 9 are located at the front end of bar 23 and here pivot pin element 32 extends horizontally through the ears 9 and the intervening end of the bar thereat, in pivotally connecting member 30 to the hanger 23.

The oscillating mechansim 25 of the embodiment shown in FIGS. 1–3 comprises a lever 57 and a rigid operating bar 58 that links the lever with the hanger. Lever 57 is pivotally connected to the bifurcated end portion of member 30 below the seat by means of a transversely extending pivot pin 59. Pin 59 serves as a fulcrum for the leverage action. The front portion or leg 60 of the lever 57 has a generally upright extending arcuate section 61 that sweeps upwardly to a transversely extending handle forming member 62. Member 62 is fixed to the upper end of section 61 and is conveniently located above and in front of the seat 24 for easy forward and rearward manipulation by the occupant, as in the directions of arrows 63 and 64. The arcuate section 61 of lever 57 starts its upward sweep at an offset point in front of the pivot pin 59 so that in the movement of the lever, sharp angles are avoided between the rear section 65 of the front lever leg 60 and the adjacent sections 48, 49 of leg forming elements 37 and 38, and which otherwise would provide a dangerous area in which limbs of the occupant could become mashed or otherwise damaged.

From FIGS. 1 and 3 it is evident that the front portion 60 of the lever 57 is adapted to extend upwardly between the legs of the seat occupant. The rear portion or leg 66 of the lever 57 on the other hand extends rearwardly from the fulcrum forming pin 59 between the upright sections of the C-shaped elements 37, 38 and generally in parallel with the ground surface. By virtue of being located generally below the seat 24, the rear leg 66 of the lever 57 is in an area which is relatively inaccessible to the occupant when the latter is on the seat and is out of reach of the occupant when the latter is falling therefrom. Consequently, there is less chance of falling into moving components of the device or inadvertently placing a limb in the way of their movements. As seen in FIG. 1 the lever 57 is pivotally connected to the lower portion of member 30 between the upright front sections 48, 49 of elements 37 and 38 and generally intermediate the upper and lower sections of such elements. Pin 59 extends through sections 48 and 49 and through the intervening lever section therebetween in effectuating the pivotal connection. From pin 59, leg 66 extends rearwardly as seen in FIGS. 1 and 3, through the space between the upright extensions 43 and 44. Extensions 43 and 44 serves as guides for swinging movement of leg 66. The end portion 67 of leg 66 in back of the extensions 43, 44 is bent somewhat off the longitudinal axis of the leg 66 to accommodate general alignment of the lower bent end section 68 of the operating bar 58 with the axis of the leg and to facilitate interconnection of the adjacent ends thereat as by pin 69. Pin 69 pivotally interconnects these ends so that forces imparted to lever 57 are transmitted to the operating bar therethrough.

As seen in FIG. 2 the hanger bar component 23 extends rearwardly of the horizontal bar 12 and is provided at its rear end 70 with a pair of transversely spaced depending ears 71. The upper end 72 of the bar 58 is pinched, like the upper end of bar 35, and fits between the ears 71 and the pivotal connection is effectuated by pivot element pin 73. Pin 73 establishes a horizontal axis for swinging movement of bar 58 and which is rearwardly spaced from and parallel to the axis of pin 32. Pin 73 extends through the ears 71 and through the intervening pinched end 72 of the bar.

In the normal position shown in FIG. 1, the elongated operating bar 58 just hangs straight down from the pivot pin 73 in back of member 30, and as heretofore mentioned is pivotally connected at its lower end to the end 67 of the rear leg 60 of lever 57 by pin 69. It is fairly apparent from the drawings that member 30 and bar 58 are adapted to swing forwardly and rearwardly relative to their respective pivot axis and generally in the same vertical plane.

The seat supporting member 30 has a small length 74 of tubing which is fixed transversely of and at the rear side 75 of the offset section 39 of bar 35. The function of this length component of member 30 is best seen by reference to FIG. 1. When the occupant is manipulating lever 57 to impart the desired oscillatory motion to the swing, there are occasions when the center of gravity for the entire apparatus may be shifted so far forward or rearwardly of the center of gravity at the normal position, that unless the framework 11 is secured in the ground or otherwise fixed at the ground level, the framework 11 starts to tip in the direction of the swing. This length component 74 of the member 30 is so disposed as to come into engagement with the front face of the operaing bar 58 when the swing has been oscillated into the extreme forward position, determined for safe use of the swing consistent with the stability of the framework 11, such as that depicted in dashed lines at 33, and also when the swing has been oscillated into the extreme rear position 34 determined for such safe use of the swing. In effect, member 30 and operating bar 58 are so adapted and arranged as to engage at predetermined forward and rear extremities of the swinging movement and this serves to stop or limit further outward movement of the swing at such extremities and thereby prevents an unbalanced condition, that would tip the supporting framework 11, from resulting.

In the embodiment illustrated the weight of the occupant is wholly supported by member 30. Member 30 in turn is suspended from hanger 23 by horizontal pin 32 for forward and rearward pivotal movement in the direction of arrows 76 and 77. By pushing on a handle member 62 of lever 57 the rear leg 66 of lever 57 is forced in the direction of arrow 78. This tends to straighten out the knuckle joint, formed at the juncture of leg 66 with operating bar 58, and causes the occupant to be swung in the forward direction of arrow 76. On the other hand when the handle member 62 is pulled in the direction of arrow 64, lever leg 66 is forced downward in the direction of arrow 79, and this tends to draw the swing backward in the direction of arrow 77. As the push-pull process progresses and momentum is gained, a pleasing ride develops from use of the swing, and the occupant simultaneously gets the obvious benefits of the exercise associated with its use.

Now the embodiment of the swing 80 shown in FIGS. 4 and 5 is in all respects like that shown in FIGS. 1–3 except that the seat supporting member 81 shown in FIGS. 4 and 5 is a modification of that shown in FIGS. 1–3 and is connected to the hanger bar 23 through a linkage component 83. Member 81, like member 30, has C-shaped elements 37 and 38 that form its lower bifurcated end (only 37 being shown in FIG. 4), and to which sett 24 is secured. The vertical extensions of the lower sections of the C-shaped elements, such as extension 43 of section 39 of element 37 are connected to the lower end of a rigid bar element 82 by fasteners 45. Bar 82 in turn is connected to the depending forward ears 9 of hanger 23 through a yoke-type linkage element 83 so that seat supporting member 81 can swing with reference to a second transversely extending horizontal pivot axis (pin 92), in addition to the axis formed by pin 32. Through use of this member 83 a braking action is secured at the forward and rearward extremities that are predetermined to be the safe limits for the swinging movement and which are generally depicted in FIG. 4 at 84 and 85 respectively, and one avoids the abrupt stopping action which is resident in the use of the embodiment shown in FIGS. 1–3.

Bar 82 has a section 86 which is rearwardly offset and which corresponds to section 36 in FIG. 1. The lower end 87 of the bar 82 fits between the extension components 43 and 44 of the C-shaped elements 37, 38 forming the lower bifurcated end of member 81 and as previously indicated are fixed thereto by fasteners 45. Section 86 has a transversely extending bearing member 88 which serves the same function as, and is like length 74 of the prior embodiment. The upper end 89 of the bar 82, unlike bar 35, terminates spacedly beneath the front end 26 of hanger 23. This end 89, as seen in FIG. 5, fits between the transversely spaced leg 90, 91 of the yoke-type linkage element 83, and is pivotally connected to element 83 thereat by pin 92. Pin 92 establishes an axis parallel to that of pivot element 32 for pivotal movement of member 81 relative to the link 83, at the forward and rear extremities of the swinging movement and extends through the legs 90, 91 and the intervening pinched upper end 89 of the bar 82 therebetween. Link 83 has an eye component 93 above the space legs thereof, and this fits in the space between ears 9 of hanger 23 whereat the link 83 is pivotally secured to the hanger 23 by pivot element 32.

The function of the link component 83 is best seen by reference to FIG. 4. When the occupant, through manipulation of the lever 57 of the oscillatory mechanism 25, has caused the swing 80 to pivot into the forward position 84, stop member 88 bears against the front face of the operating bar 58. Any forward momentum operating on the swing at the time of first engagement between bar 58 and element 88 causes the bearing element 88 to ride up on the bar 58 in the direction of arrow 95 as the swing progresses farther in the forward direction. Under these circumstances a bend, such as that indicated at 96', develops in the normally straight knucklejoint 96 which is formed at the juncture of the bar 82 and link 83, and the force counteracting this bending tendency serves to brake further advancement of the swing 80 in the forward direction. A similar braking action transpires when the element 88 and bar 58 come into bearing engagement at the rear extremity of the backswing. In addition to the braking action secured through use of the linkage, a variance in the ride is secured at the extremities of swinging movement, it being apparent from the illustration that the seat will be drawn closer to the hanger when a bend develops at the knuckle-joint 96.

Except for the lever component 98 of the oscillating mechanism 97, and an element 99 employed for spacing apart the lower section 39, 40 of the C-shaped elements 37, 38, the embodiment of the swing, designated 100, and shown in FIGS. 6 and 7, is like that shown in FIGS 1–3. The modifications incorporated in swing 100 are designed primarily to permit both leg and arm action by the seat occupant in effecting the oscillatory movement of the swing.

As seen in FIG. 7 the lower sections 39, 40 of the C-shaped elements 37, 38 that constitute the bifurcated lower end of the seat supporting member 30 are spaced apart by a small length of tube 99 that serves as a spacer thereat. Sections 39, 40 are secured to the intervening tube 99 by bolt type fasteners 42.

The lever component 98 of oscillating mechanism 97 by swing 100 has a rear leg 102 which is pivotally connected to the seat supporting member 30 by pivot pin 59, and like the corresponding leg shown in FIGS. 1–3, extends rearwardly from the fulcrum formed by pin 59 spacedly above the lower sections 39, 40 of the C-shaped elements 37, 38 and below the seat 24, and thence between the upright extensions 43, 44 to the pivotal connection effectuated by pin 69 with the operating bar 58 of the mechanism 97. The front leg 106 of the lever 98 has a generally upright arcuate section 107 that terminates at its upper end in a handle component 108 suitable for hand grasping by the seat occupant.

Lever 98 also has a downwardly and forwardly inclined auxiliary front leg section 109 which is provided with a transverse member 110 at its front end. Member 110 serves as a foot rest. It is deemed apparent that both feet and the hands may be used in this case to effectuate forward and rearward movement of the swing, thus enabling exercise of all four principal limbs of the seat occupant.

The arcuate section 107 in the illustration, and the incline auxiliary leg section 109 juncture and are fixed together at a point offset from the upright front sections 48, 49 of elements 37 and 38 so as to avoid potentially dangerous areas in and adjacent to the front portions 48, 49 of the C-shaped members 37, 38.

The various components of the swings depicted in the illustrations may be made from any suitable material, it being apparent that metal components are preferred.

One factor resident in the illustrated embodiment is that no moving structure is present at either side of the seat which would obstruct a fall of the seat occupant in such lateral directions or enable the occupant to become entangled in moving components. Except for the forward legs of the levers, all moving components with which the seat occupant can be injured are located either beneath the seat or otherwise out of the general area of normal limb activity of the seat occupant.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A swing comprising hanger means, means for supporting said hanger means spacedly above the ground, a seat, an elongated seat supporting member having a lower portion on which said seat is supported and to which said seat is connected, and further having an end portion disposed spacedly above said seat, means interconnecting said hanger means and said end portion including first pivot means engaging said hanger means and establishing a first horizontal axis for swinging movement of said seat supporting member, and a mechanism manually manipulatable to oscillate said seat relative to said first horizontal axis, said mechanism including an elongated rigid member, second pivot means interconnecting an end of said rigid member with said hanger and establishing a second horizontal axis offset from said first horizontal axis for swing movement of said rigid member in back of said elongated seat supporting member, a lever having opposite legs, third pivot means establishing a fulcrum for leverage action of said lever and interconnecting said lever and said lower portion spacedly below said seat, and fourth pivot means interconnecting one of said legs with the other end of said rigid member, said one of said legs extending rearwardly of said third pivot means, and the other of said legs having a handled section disposed in front of said seat for manual manipulation by the seat occupant thereat.

2. A swing in accord with claim 1 wherein said elongated seat supporting member and said elongated rigid member are adapted and arranged to contact one another at respective predetermined forward and rearward extremities of swinging movements thereof to limit the forward and rearward extremities of oscillation of the swing thereat.

3. A swing in accord with claim 1 wherein said means interconnecting said hanger means and said end portion further includes link means pivotally connected to said hanger means by said first pivot means, and fifth pivot means pivotally interconnecting said end portion and said link means establishing an axis parallel to said first horizontal axis for pivotal movement of said link means relative to said seat supporting member, and wherein said elongated seat supporting member and said elongated rigid member are adapted and arranged to contact one another at respective predetermined forward and rearward extremities of oscillation thereof, thereby at said extremities to cause said link means and seat supporting means to pivot relative to the axis established by said fifth pivot means, and to brake the swinging movement of the swing thereat.

4. A swing in accord with claim 1 wherein said lever has an auxiliary leg fixed at one end to said other of the lever legs in front of said third pivot means, said auxiliary leg being adapted and arranged below said other of said lever legs to serve as a foot rest manipulatable by the seat occupant to impart leverage action to said lever.

5. A swing comprising hanger means, means for supporting said hanger means spacedly above the ground, a seat, an elongated seat supporting member having a bifurcated lower portion on which said seat is supported and to which said seat is connected, and further having an end portion disposed spacedly above said seat, means interconnecting said hanger means and said end portion including first pivot means engaging said hanger means and establishing a first horizontal axis for swinging movement of said seat supporting member, and a mechanism manually manipulatable to oscillate said seat relative to said first horizontal axis, said mechanism including an elongated rigid member, second pivot means interconnecting an end of said rigid member with said hanger and establishing a second horizontal axis offset from and in back of said first horizontal axis for swinging movement of said rigid member in back of said elongated seat supporting member, a lever having opposite legs, third pivot means connecting said lever between the legs of said bifurcated portion spacedly below the seat supported thereby and establishing a fulcrum for leverage action of said lever, and fourth pivot means interconnecting one of the lever legs with the other end of said rigid member, said one of said lever legs extending rearwardly of said third pivot means, and the other of said lever legs having a handled section disposed in front of said seat for manual manipulations by the seat occupant thereat, and said legs of said bifurcated portion having respective sections rearwardly of said third pivot means serving as vertical guides at the opposite sides of and for pivotal movement of said one of said lever legs.

References Cited in the file of this patent

UNITED STATES PATENTS

| 2,402,249 | Hunt | June 18, 1946 |
| 2,478,673 | Soderholm | Aug. 9, 1949 |
| 2,553,932 | Moser | May 22, 1951 |